(12) United States Patent
Liu et al.

(10) Patent No.: US 11,908,040 B2
(45) Date of Patent: Feb. 20, 2024

(54) IMAGE PROCESSING METHOD AND COMPUTER SYSTEM

(71) Applicant: HUAWEI TECHNOLOGIES CO., LTD., Shenzhen (CN)

(72) Inventors: Lingfei Liu, Shanghai (CN); Lixin Chen, Shanghai (CN); Yang Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 231 days.

(21) Appl. No.: 17/487,306

(22) Filed: Sep. 28, 2021

(65) Prior Publication Data

US 2022/0012845 A1 Jan. 13, 2022

Related U.S. Application Data

(63) Continuation of application No. PCT/CN2020/078827, filed on Mar. 11, 2020.

(30) Foreign Application Priority Data

Mar. 30, 2019 (CN) .......................... 201910260921.4

(51) Int. Cl.
*G06T 1/20* (2006.01)
*G06T 1/00* (2006.01)
*G06T 9/00* (2006.01)

(52) U.S. Cl.
CPC .............. *G06T 1/20* (2013.01); *G06T 1/0007* (2013.01); *G06T 9/00* (2013.01)

(58) Field of Classification Search
None
See application file for complete search history.

(56) References Cited

U.S. PATENT DOCUMENTS

| 2011/0050712 | A1 | 3/2011 | Jackson |
| 2013/0159563 | A1 | 6/2013 | Diard |
| 2014/0055470 | A1 | 2/2014 | Diard |

(Continued)

FOREIGN PATENT DOCUMENTS

| CN | 102446341 A | 5/2012 |
| CN | 108804199 A | 11/2018 |

OTHER PUBLICATIONS

Yusuke Suzuki et al., GPUvm: GPU Virtualization at the Hypervisor, IEEE Transactions on Computers, IEEE, USA, vol. 65, No. 9, pp. 2752-2766, ISSN: 0018-9340, DOI: 10.1109/TC.2015.2506582, X P011618572, Sep. 1, 2016.

*Primary Examiner* — Robert J Craddock
(74) *Attorney, Agent, or Firm* — Maier & Maier, PLLC (57) ABSTRACT

An image processing method and a computer system. The method may be applied to a cloud-side server in a cloud mobile phone. The server may be a virtualization server, a host operating system and a guest operating system are deployed on the server, a user mode graphics driver is deployed in the guest operating system, and a kernel mode graphics driver is deployed in the host operating system. The user mode graphics driver and the kernel mode graphics driver collaborate with each other to implement image rendering of the server. Then, the server may send a rendered image to the cloud mobile phone. Accordingly, an instruction translation process is reduced, to reduce overheads of a processor and improve image processing efficiency.

15 Claims, 8 Drawing Sheets

(56) References Cited

U.S. PATENT DOCUMENTS

2017/0004808 A1    1/2017  Agashe et al.
2018/0089881 A1    3/2018  Johnson
2018/0308288 A1*  10/2018  Harscoet ................. G06T 11/00

* cited by examiner

IMAGE PROCESSING METHOD AND COMPUTER SYSTEM

CROSS-REFERENCE TO RELATED APPLICATIONS

This application is a continuation of International Application No. PCT/CN2020/078827, filed on Mar. 11, 2020, which claims priority to Chinese Patent Application No. 201910260921.4, filed on Mar. 30, 2019. The disclosures of the aforementioned applications are hereby incorporated by reference in their entireties.

TECHNICAL FIELD

The embodiments relate to the field of computer technologies, and in particular, to an image processing method, a computer system, or the like.

BACKGROUND

Figure 1:
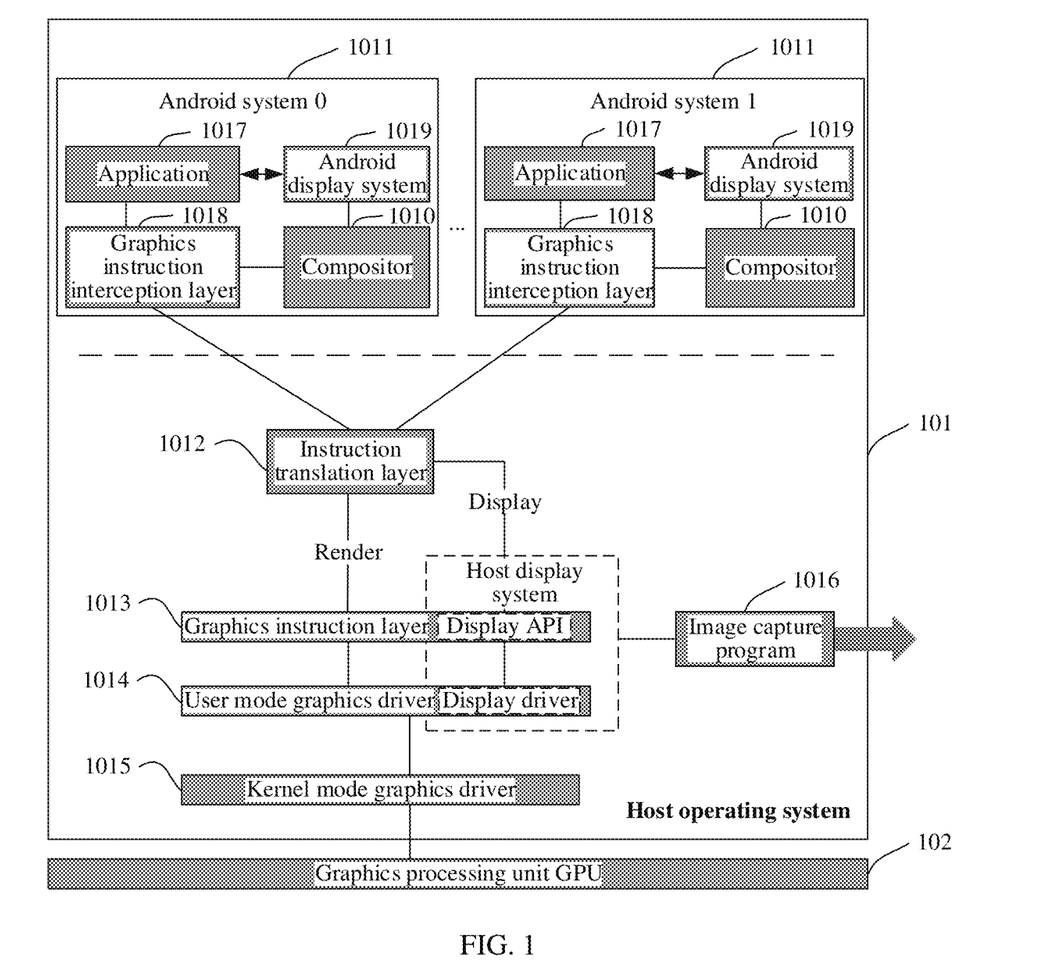
FIG. 1 is a schematic architectural diagram of a server in the prior art.

A software/hardware system of a mobile phone is simulated on the cloud, so that it is possible to perform a simulation of the mobile phone, a scale test, collaborative development of a mobile application, mobile working, cross-platform trial playing and promotion of a mobile game, and the like based on a cloud platform. This mode can be widely applied. In a conventional implementation, one independent operating system (for example, an Android system) is run on a mobile phone. To provide the cloud with a function the same as that of the mobile phone, the operating system of the mobile phone needs to be able to be run on a server. The server features high performance Therefore, a plurality of operating system of the mobile phone can be concurrently run on one server to efficiently utilize server resources. FIG. 1 is a schematic architectural diagram of a server. A host operating system 101 is installed in the server. A plurality of Android systems 1011 (two Android systems are used as an example in FIG. 1), an instruction translation layer 1012, a graphics instruction layer (graphic API layer) 1013, a user mode graphics driver 1014, a kernel mode graphics driver 1015, an image capture program 1016, and a graphics processing unit (GPU) 102 are deployed in the host operating system. An application (app) 1017, a graphics instruction interception layer (graphic API interception layer) 1018, an Android display system (surfaceflinger) 1019, and a compositor (composer) 1010 are deployed in the Android system 1011. The following describes how the server performs an image processing task for each Android system based on the foregoing modules.

1. The application 1017 is configured to generate a graphics rendering parameter, and initiate a first application programming interface (API) instruction to the graphics instruction interception layer 1018. The first API instruction is used to request to perform graphics rendering based on the graphics rendering parameter.

2. The graphics instruction interception layer 1018 intercepts the graphics rendering parameter and the first API instruction, and transfers the graphics rendering parameter and the first API instruction to the instruction translation layer 1012 through a communications pipe (PIPE).

3. The instruction translation layer 1012 translates the first API instruction into a second API instruction that can be identified by the graphics instruction layer 1013 in the host operating system.

4. The user mode graphics driver 1014 obtains the graphics rendering parameter and the second API instruction that are delivered by the graphics instruction layer 1013, and generates, based on the graphics rendering parameter and the second API instruction, a command that can be identified by the GPU.

5. The kernel mode graphics driver 1015 controls, based on the command delivered by the user mode graphics driver 1014, the GPU to perform image rendering.

6. The Android display system 1019 controls the compositor 1010 to composite a plurality of layer layers generated when the GPU performs image rendering. In a composition process, the compositor 1010 generates an instruction, and the instruction is still intercepted by the graphics instruction capture layer 1018. Then, the instruction sequentially passes through the instruction translation layer 1012, the graphics instruction layer 1013, the user mode graphics driver 1014, and the kernel mode graphics driver 1015. Finally, the GPU 102 completes a composition operation. Image data generated through composition is stored in a double graphics buffer.

7. In cooperation with the graphics instruction layer 1013 and the user mode graphics driver 1014, the image capture program 1016 captures the image data from the double graphics buffer, and sends the captured image data to a remote end for display, for example, to a mobile phone for display.

Based on the foregoing architecture, the cloud server may provide an image processing task for the plurality of Android systems. However, each instruction that is related to image rendering, composition, display, and the like and that is generated in the Android system needs to be intercepted by the graphics instruction interception layer 1018, and translated by the instruction translation layer 1012. Consequently, CPU overheads of the server are very high.

SUMMARY

The following describes solutions provided in the embodiments in different aspects. It may be understood that mutual reference may be made to implementations and beneficial effects of the different aspects.

Embodiments disclose an image processing method and a computer system. According to the solutions of the embodiments, overheads of a processor can be reduced, and image processing efficiency can be improved.

According to a first aspect, an embodiment provides an image processing method. The method is applied to a computer system, for example, a server. The server includes a host operating system and a first guest operating system, a kernel mode graphics driver is installed in the host operating system, and an application and a user mode graphics driver are installed in each of the guest operating system. The method includes: an application with an image processing requirement in the first guest operating system initiates a first application programming interface (API) call request by using a graphics instruction layer. The first API call request is used to request to perform an image rendering operation. The first guest operating system may be any one of a plurality of guest operating systems deployed on the server. A user mode graphics driver in the first guest operating system generates, based on the first API call request, a first instruction that can be identified by the graphics processing unit, and sends the first instruction to the kernel mode graphics driver. The kernel mode graphics driver controls, according to the first instruction, the graphics processing unit to perform image rendering.

It should be noted that in some virtualized computer architectures, it may be understood that the guest operating system is deployed in the host operating system.

According to the foregoing method, the user mode graphics driver is deployed in the guest operating system, and the kernel mode graphics driver is deployed in the host operating system other than the guest operating system. A command generated by the user mode graphics driver may be directly submitted by the kernel mode graphics driver to the GPU for execution. Therefore, an instruction translation layer used to translate a command does not need to be additionally deployed between the guest operating system and the host operating system. Therefore, there is no need to perform an instruction translation operation by the instruction translation layer. Therefore, overheads of the server are significantly reduced, an overall image processing (for example, rendering) process is simplified, and image processing efficiency is improved.

Even if a version of the guest operating system of the server is updated, the command generated by the user mode graphics driver in the guest operating system may still be directly identified by the kernel mode graphics driver in the host operating system. Therefore, in comparison with a conventional method, updating and maintenance of the instruction translation layer can be omitted, and overheads of the server are further reduced. It may be understood that the reduced overheads may be used to support deployment of more guest operating systems on the server, to increase a concurrency amount of the server.

With reference to the first aspect, in a first possible implementation of the first aspect, each guest operating system further includes an image compositor (which may also be referred to as a compositor for short) and an image capture program. The method further includes: if the image capture program is in an enabled state, the image compositor performs an image composition operation on a plurality of layer layers obtained by the graphics processing unit through rendering; and the image compositor skips performing the image composition operation on the plurality of layer layers if the image capture program is in a disabled state.

It can be understood that, based on the foregoing policy of performing image composition based on a requirement, an image composition task is not performed when the image capture program is in the disabled state, to significantly reduce overheads of the server, so that the server can apply more computing capabilities to another Android operating system with a requirement, and overall performance of a cloud server is improved.

With reference to the first aspect or the foregoing possible implementation of the first aspect, in a second possible implementation of the first aspect, if the image capture program is in the enabled state, a rate at which the image compositor performs image composition is the same as a rate at which the image capture program performs image capture.

According to this manner, the image composition task is reduced as much as possible when a requirement of the image capture program is ensured. Therefore, overheads of the server are reduced to a maximum extend, so that the server can apply more computing capabilities to another Android operating system with a requirement, and overall performance of a cloud server is improved.

With reference to any one of the first aspect or the foregoing possible implementations of the first aspect, in a third possible implementation of the first aspect, if the image capture program is in the enabled state, the method further includes: the image capture program captures a composite image obtained by the image compositor through composition; the image capture program encodes and compresses the composite image; and the image capture program sends image data obtained through encoding and compression to a remote end.

With reference to any one of the first aspect or the foregoing possible implementations of the first aspect, in a fourth possible implementation of the first aspect, the server further includes an image encoder; and if the image capture program is in the enabled state, the method further includes: the image encoder performs coding and compression on the composite image obtained by the image compositor through composition; the image capture program captures the image data obtained through encoding and compression; and the image capture program sends the image data to the remote end.

With reference to any one of the first aspect or the foregoing possible implementations of the first aspect, in a fifth possible implementation of the first aspect, that the image compositor performs an image composition operation on a plurality of layer layers obtained by the graphics processing unit through rendering includes: the image compositor reads the plurality of layer layers obtained by the graphics processing unit through rendering; the image compositor sends an image composition instruction to the user mode graphics driver by using a generic buffer manager, where the image composition instruction is used to request to perform the image composition operation on the plurality of layer layers; the user mode graphics driver generates, based on the image composition instruction, a second instruction that can be identified by the graphics processing unit, and sends the second instruction to the kernel mode graphics driver; and the kernel mode graphics driver controls, based on the second instruction, the graphics processing unit to perform the image composition operation on the plurality of layer layers.

According to a second aspect, an embodiment provides an image processing method. The method is applied to a computer system, the computer system includes a host operating system and a first guest operating system, a kernel mode graphics driver is installed in the host operating system, and an application and a user mode graphics driver are deployed in the first guest operating system. The method includes: initiating a first API call request by using an application, where the first API call request is used to request to perform an image rendering operation; the user mode kernel driver generates, based on the first API call request, a first instruction that can be identified by the graphics processing unit, and sends the first instruction to the kernel mode graphics driver; and the kernel mode graphics driver performs, according to the first instruction, the graphics processing unit to perform image rendering.

In the host operating system other than the user operating system, a command generated by the user mode graphics driver may be directly submitted by the kernel mode graphics driver to the GPU for execution. Therefore, an instruction translation layer used to translate a command does not need to be additionally deployed between the guest operating system and the host operating system. Therefore, there is no need to perform an instruction translation operation by the instruction translation layer. Therefore, overheads of a server are significantly reduced, an overall image processing (for example, rendering) process is simplified, and image processing efficiency is improved.

Even if a version of the guest operating system of the server is updated, the command generated by the user mode graphics driver in the guest operating system may still be directly identified by the kernel mode graphics driver in the host operating system. Therefore, in comparison with a conventional method, updating and maintenance of the instruction translation layer can be omitted, and overheads of the server are further reduced. It may be understood that, the reduced overheads may be used to support deployment of more guest operating systems on the server, to increase a concurrency amount of the server.

With reference to the second aspect, in a first possible implementation of the second aspect, the first guest operating system further includes an image compositor and an image capture program, and the method further includes: the image compositor determines that the image capture program is in an enabled state; and the image compositor performs an image composition operation on a plurality of layer layers obtained by the graphics processing unit through rendering.

With reference to the second aspect, in a first possible implementation of the second aspect, the image compositor determines that the image capture program is in a disabled state, and the image compositor skips performing the image composition operation on the plurality of layers layers.

It can be understood that, based on the foregoing policy of performing image composition based on a requirement, an image composition task is not performed when the image capture program is in the disabled state, to significantly reduce overheads of the server, so that the server can apply more computing capabilities to another Android operating system with a requirement, and overall performance of a cloud server is improved.

With reference to any one of the second aspect or the foregoing possible implementations of the second aspect, in a second possible implementation of the second aspect, before the image compositor determines a status of the image capture program, the method further includes: the image capture program registers state information with the compositor. The state information is used to represent that the image capture program is in the enabled state or in the disabled state.

With reference to any one of the second aspect or the foregoing possible implementations of the second aspect, in a third possible implementation of the second aspect, if the image capture program is in the enabled state, a rate at which the image compositor performs image composition is the same as a rate at which the image capture program performs image capture.

According to this manner, the image composition task is reduced as much as possible when a requirement of the image capture program is ensured. Therefore, overheads of the server are reduced to a maximum extend, so that the server can apply more computing capabilities to another Android operating system with a requirement, and overall performance of a cloud server is improved.

With reference to any one of the second aspect or the foregoing possible implementations of the second aspect, in a fourth possible implementation of the second aspect, if the image capture program is in the enabled state, the method further includes: the image capture program captures a composite image obtained by the image compositor through composition; the image capture program encodes and compresses the composite image; and the image capture program sends image data obtained through encoding and compression to a remote end.

With reference to any one of the second aspect or the foregoing possible implementations of the second aspect, in a fifth possible implementation of the second aspect, the computer system further includes an image encoder; and if the image capture program is in the enabled state, the method further includes: the image encoder encodes and compresses the composite image obtained by the image compositor through composition; the image capture program captures image data obtained through encoding and compression; and the image capture program sends the image data to the remote end.

With reference to any one of the second aspect or the foregoing possible implementations of the second aspect, in a sixth possible implementation of the second aspect, that the image compositor performs an image composition operation on the plurality of layer layers obtained by the graphics processing unit through rendering includes: the image compositor reads the plurality of layer layers obtained by the graphics processing unit through rendering; the image compositor sends an image composition instruction to the user mode graphics driver by using a generic buffer manager, where the image composition instruction is used to request to perform the image composition operation on the plurality of layer layers; the user mode graphics driver generates, based on the image composition instruction, a second instruction that can be identified by the graphics processing unit, and sends the second instruction to the kernel mode graphics driver; and the kernel mode graphics driver controls, based on the second instruction, the graphics processing unit to perform the image composition operation on the plurality of layer layers.

According to a third aspect, an embodiment provides a computer system. A host operating system is deployed in the computer system, a kernel mode graphics driver and a first guest operating system are deployed in the host operating system, and an application and a user mode graphics driver are deployed in the first guest operating system. The user mode kernel driver is configured to: receive a first API call request from the application, where the first API call request is used to request to perform an image rendering operation; and generate, based on the first API call request, a first instruction that can be identified by a graphics processing unit, and send the first instruction to the kernel mode graphics driver; and the kernel mode graphics driver is configured to control, according to the first instruction, the graphics processing unit to perform the image rendering operation.

In the foregoing server, the user mode graphics driver is deployed in the guest operating system, and the kernel mode graphics driver is deployed in the host operating system other than the guest operating system. A command generated by the user mode graphics driver may be directly submitted by the kernel mode graphics driver to the GPU for execution. Therefore, an instruction translation layer used to translate a command does not need to be additionally deployed between the guest operating system and the host operating system. Therefore, there is no need to perform an instruction translation operation by the instruction translation layer. Therefore, overheads of the server are significantly reduced, an overall image processing (for example, rendering) process is simplified, and image processing efficiency is improved. In addition, even if a version of the guest operating system of the server is updated, the command generated by the user mode graphics driver in the guest operating system can still be directly identified by the kernel mode graphics driver in the host operating system. Therefore, in comparison with a conventional method, updating and maintenance of the instruction translation layer can be omitted, and overheads of the server are further reduced. It may be understood that the reduced overheads may support deployment of more guest operating systems on the server, to increase a concurrency amount of the server.

With reference to the third aspect, in a first possible implementation of the third aspect, the first guest operating system further includes an image compositor and an image capture program. The image compositor is configured to determine a status of the image capture program; the image compositor is configured to: when the image capture program is in an enabled state, perform an image composition operation on a plurality of layer layers obtained by the graphics processing unit through rendering; and the image compositor is configured to skip performing the image composition operation on the plurality of layer layers if the image capture program is in a disabled state.

It can be understood that, based on the foregoing policy of performing image composition based on a requirement, an image composition task is not performed when the image capture program is in the disabled state, to significantly reduce overheads of the server, so that the server can apply more computing capabilities to another Android operating system with a requirement, and overall performance of a cloud server is improved.

With reference to the third aspect or the foregoing possible implementation of the third aspect, in a second possible implementation of the third aspect, the image capture program is configured to register state information with the compositor before the image compositor determines the status of the image capture program. The state information is used to represent that the image capture program is in the enabled state or in the disabled state.

With reference to any one of the third aspect or the foregoing possible implementations of the third aspect, in a third possible implementation of the third aspect, if the image capture program is in the enabled state, a rate at which the image compositor performs image composition is the same as a rate at which the image capture program performs image capture.

According to this manner, the image composition task is reduced as much as possible when a requirement of the image capture program is ensured. Therefore, overheads of the server are reduced to a maximum extend, so that the server can apply more computing capabilities to another Android operating system with a requirement, and overall performance of a cloud server is improved.

With reference to any one of the third aspect or the foregoing possible implementations of the third aspect, in a fourth possible implementation of the third aspect, the image capture program is configured to: when the image capture program is in the enabled state, capture a composite image obtained by the image compositor through composition; and encode and compress the composite image, and send image data obtained through encoding and compression to a remote end.

With reference to any one of the third aspect or the foregoing possible implementations of the third aspect, in a fifth possible implementation of the third aspect, the server further includes an image encoder. The image encoder is configured to: when the image capture program is in the enabled state, encode and compress the composite image obtained by the image compositor through composition; and the image capture program is configured to: capture the image data obtained through encoding and compression, and send the image data to the remote end.

With reference to any one of the third aspect or the foregoing possible implementations of the third aspect, in a sixth possible implementation of the third aspect, that the image compositor is configured to: when the image capture program is in an enabled state, perform the image composition operation on the plurality of layer layers obtained by the graphics processing unit through rendering is as follows:

The image compositor is configured to: when the image capture program is in the enabled state, read the plurality of layer layers obtained by the graphics processing unit through rendering; the image compositor is configured to send an image composition instruction to the user mode graphics driver by using a generic buffer manager, where the image composition instruction is used to request to perform an image composition operation on the plurality of layer layers; the user mode graphics driver is configured to generate, based on the image composition instruction, a second instruction that can be identified by the graphics processing unit, and send the second instruction to the kernel mode graphics driver; and the kernel mode graphics driver is configured to control, based on the second instruction, the graphics processing unit to perform the image composition operation on the plurality of layer layers.

According to a fourth aspect, an embodiment provides a server. The server includes a first processor, a memory, and a graphics processing unit, the memory is configured to store program code and data that are required when a host operating system is run, and the processor is configured to run the host operating system, to control the graphics processing unit to implement the method described in any one of the first aspect or the possible implementations of the first aspect.

According to a fifth aspect, an embodiment provides a computer-readable storage medium. The computer-readable storage medium is configured to store program code (or referred to as a computer-readable instruction), and when the program code is run on one or more processors, the method described in any one of the foregoing aspects is implemented.

According to a sixth aspect, an embodiment provides a computer program product (also referred to as a computer program). The computer program product (or referred to as a computer program) is configured to store program code (also referred to as a computer-readable instruction), and when the program code is run on one or more processors, the method described in any one of the foregoing aspects is implemented.

In the embodiments, the user mode graphics driver is deployed in the guest operating system, and the kernel mode graphics driver is deployed in the host operating system other than the guest operating system. The command generated by the user mode graphics driver may be directly submitted by the kernel mode graphics driver to the GPU for execution. Therefore, the instruction translation layer used to translate a command does not need to be additionally deployed between the guest operating system and the host operating system. Therefore, there is no need to perform an instruction translation operation by the instruction translation layer. Therefore, overheads of the server are significantly reduced, an overall image processing (for example, rendering) process is simplified, and image processing efficiency is improved. In addition, even if a version of the guest operating system of the server is updated, the command generated by the user mode graphics driver in the guest operating system can still be directly identified by the kernel mode graphics driver in the host operating system. Therefore, in comparison with a conventional method, updating and maintenance of the instruction translation layer can be omitted, and overheads of the server are further reduced. It may be understood that the reduced overheads may support deployment of more guest operating systems on the server, to increase a concurrency amount of the server.

DETAILED DESCRIPTION OF THE EMBODIMENTS

The following describes solutions in embodiments with reference to accompanying drawings.

Figure 2:
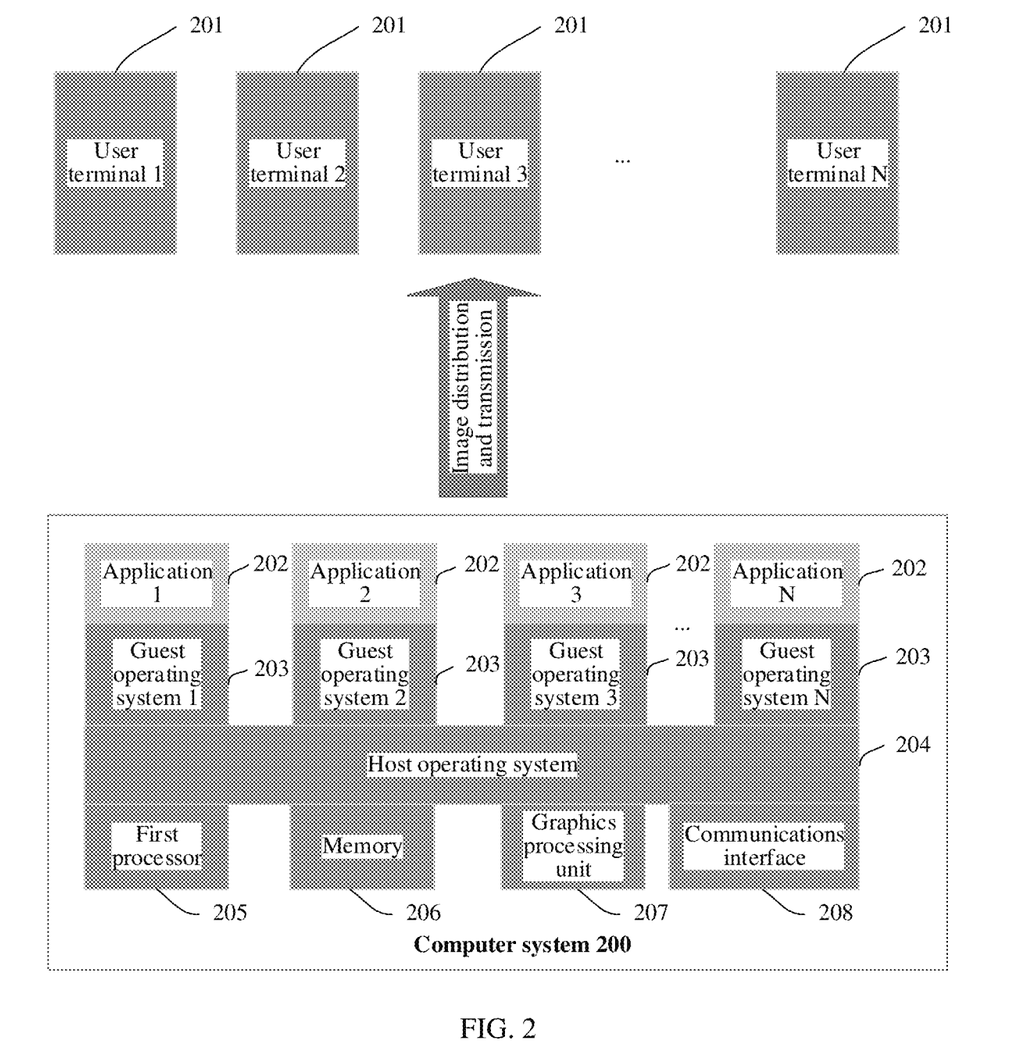
FIG. 2 is a schematic diagram of a scenario in which a cloud server is run according to an embodiment.

FIG. 2 is a schematic diagram of a scenario in which a computer system is run according to an embodiment. In FIG. 2, a computer system 200 may simultaneously provide a service for a plurality of user terminals 201. For example, a host operating system 204 is installed in the computer system 200, a plurality of guest operating systems 203 are installed in the host operating system, and an application 202 is installed in each guest operating system. The host operating system 204 may allocate hardware resources such as a first processor 205, a memory 206, and a graphics processing unit 207 to each guest operating system 203, so that each guest operating system 203 is run relatively independently. This is equivalent to a case in which each guest operating system 203 is run on a different hardware device. Each guest operating system 203 in the computer system 200 may separately provide a service for a different user terminal 201, and the guest operating system 203 (or another operating system different from the guest operating system 203) may or may not be installed on each user terminal 201. The computer system 200 provides the user terminal 201 with an interface and a function of the guest operating system 203. Therefore, from a perspective of a user, the user terminal 201 is a terminal that can implement a function of the guest operating system. For example, when the guest operating system 203 is an Android system, from the perspective of the user, the user terminal 201 is equivalent to a terminal that can implement a function of an Android mobile phone. When the terminal is a mobile phone, the terminal may also be referred to as a cloud mobile phone.

The terminal mentioned in this embodiment may be, but is not limited to, a laptop computer, a desktop computer, a mobile phone, a smartphone, a tablet, a multimedia player, an e-reader, an intelligent vehicle-mounted device, a smart home appliance, an artificial intelligence device, a wearable device, an internet of things device, a virtual reality device/an augmented reality device/a mixed reality device, or the like.

The computer system 200 may be a server, or may be a server cluster including a plurality of servers, or may be another hardware device having a computing capability. The server may be a server of an ARM (Advanced RISC Machine) architecture or a server of another architecture type. The following describes the computer system 200 with reference to FIG. 3. A hardware layer of the computer system 200 includes the first processor 205, the memory 206, the graphics processing unit 207, and a communications interface 208. A software layer of the computer system 200 includes the host operating system 204.

Figure 3:
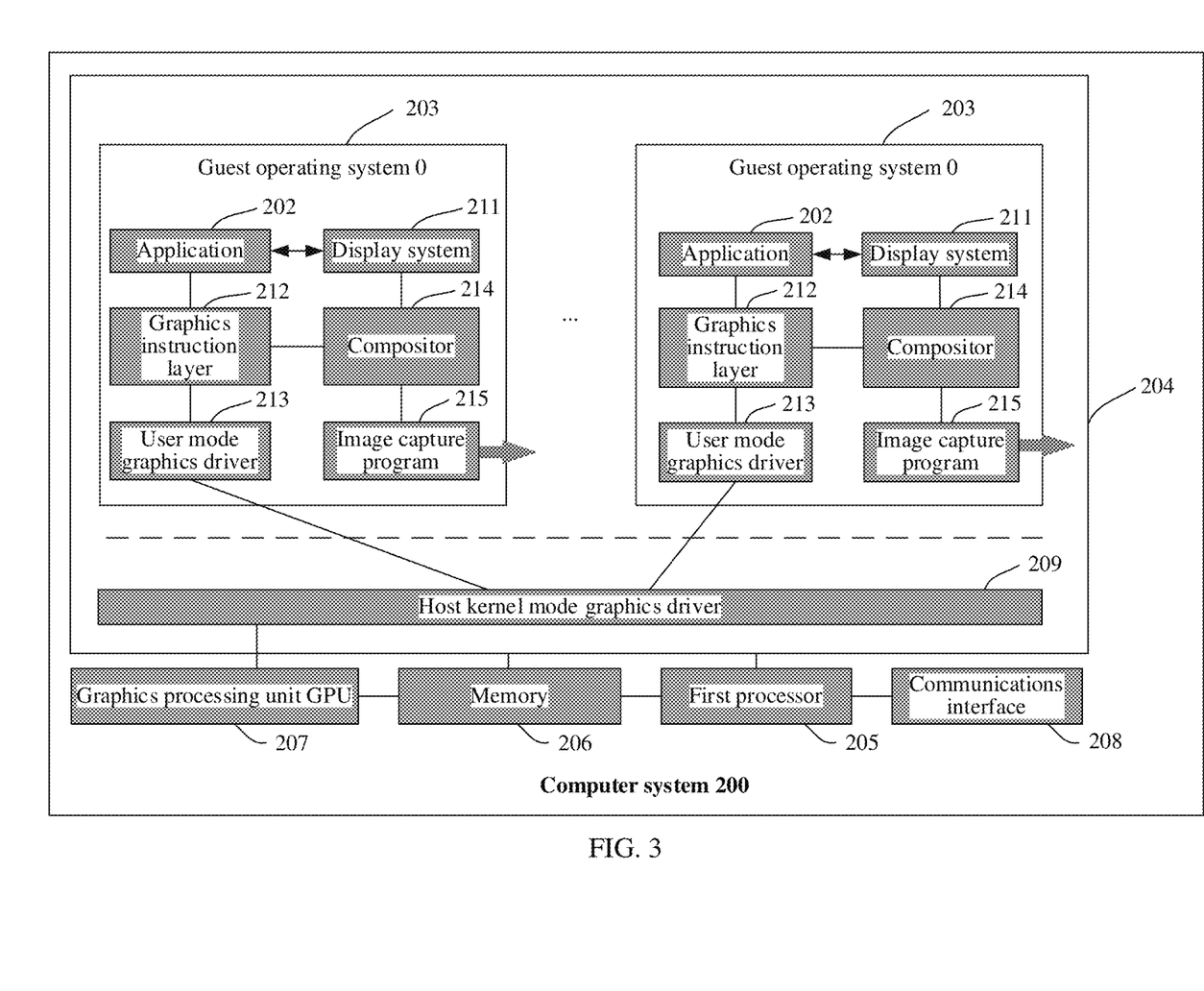
FIG. 3 is a schematic architectural diagram of a server according to an embodiment.

The memory 206 includes but is not limited to a random access memory ( ) a read-only memory (ROM), an erasable programmable read only memory (EPROM), or a portable compact disc read-only memory (CD-ROM). The memory 206 is configured to: store a related program instruction and data for reading by the first processor 205 and/or the graphics processing unit (GPU) 207, and store (or cache) data generated by running the first processor 205 and/or the graphics processing unit; and may also store data from another source.

The first processor 205 may be one or more central processing units (CPU). When the first processor 205 is a CPU, the first processor 205 may be a single-core processor, or may be a multi-core processor. Further, the first processor 205 may alternatively be another circuit with a computing capability, or a chip. The first processor 205 can run the host operating system, and process various tasks (or events) generated in the host operating system, including processing a task requested by the guest operating system in the host operating system, for example, execution of an image-related processing policy.

There may be one or more graphics processing units 207. When there is one graphics processing unit 207, the graphics processing unit 207 may be a single-core processor, or may be a multi-core processor. The graphics processing unit 207 can process some image processing—related tasks (or events) generated in the host operating system, including an image processing task (which may be an image processing task generated by the application 202) requested by the guest operating system 203, for example, image rendering, image composition, and migration of image data obtained through composition.

It should be noted that the first processor runs the host operating system, the guest operating system is run in the host operating system, and the guest operating system may also be understood as an application in the host operating system.

The communications interface 208 is configured to receive data sent by a device other than the computer system 200, for example, receive an instruction for calling the guest operating system 203 by the user terminal 201. The communications interface 208 is further configured to send data to the device other than the computer system 200. For example, after completing image processing, the computer system 200 sends data obtained after processing to the user terminal 201. Optionally, the communications interface 208 receives and sends data under control of the first processor 205. A communication manner of the communications interface 208 may be wired communication, or may be wireless communication (for example, communication performed through wireless fidelity Wi-Fi, Bluetooth, or the like).

The host operating system 204 may be a Linux system or another operating system. A kernel mode graphics driver 209 (for example, the kernel mode graphic driver) and the plurality of guest operating systems 203 are installed in the host operating system 204. In this embodiment, the guest operating system may be an Android system, or may be another type of Linux system, or another operating system. For ease of understanding, the Android system is used as an example for description in subsequent examples. Each guest operating system 203 is installed with the application 202 (for example, a game application or a video production application) that has an image processing requirement, a graphics instruction layer 212 (for example, an Android graphic API), a user mode graphics driver 213 (for example, an Android user mode graphic driver), a display system 211 (for example, SurfaceFlinger (Android display system), a compositor (composition) 214, and an image capture program 215 (for example, Image Capture).

It can be understood that different from a conventional case in which both the user mode graphics driver 213 and the kernel mode graphics driver 209 are deployed in the guest operating system 203, or both the user mode graphics driver 213 and the kernel mode graphics driver 209 are deployed in the host operating system 204, in this embodiment, the user mode graphics driver 213 is deployed in the guest operating system 203, and the kernel mode graphics driver 209 is deployed in the host operating system 204. A command (or referred to as an instruction) generated by the user mode graphics driver 213 may be directly submitted by the kernel mode graphics driver 209 to the GPU for execution. Therefore, an instruction translation layer used to translate a command does not need to be additionally deployed between the guest operating system 203 and the host operating system. Therefore, there is no need to perform an instruction translation operation by the instruction translation layer. Therefore, overheads of the first processor in the computer system 200 are significantly reduced, an overall image processing (for example, rendering) process is simplified, and image processing efficiency is improved. In addition, even if a version of the guest operating system 203 in the computer system 200 is updated, the command generated by the user mode graphics driver 213 in the guest operating system 203 may still be directly identified by the kernel mode graphics driver 209 in the host operating system 204. Therefore, in comparison with a conventional method, updating and maintenance of the instruction translation layer can be omitted, and overheads of the first processor in the computer system 200 are further reduced. It may be understood that the reduced overheads may support deployment of more guest operating systems in the computer system 200. In other words, a concurrency amount of the computer system is improved.

In addition, different from a conventional case in which the image capture program 215 is deployed in the host operating system 204. In this embodiment, the image capture program is deployed in the guest operating system 203. Therefore, the image capture program 215 may be directly connected to the compositor 214. In this case, the compositor may perform an image composition operation based on a requirement and an image data capture capability of the image capture program 215, to reduce an unnecessary computation operation and reduce image processing pressure of the graphics processing unit 207.

Figure 4:
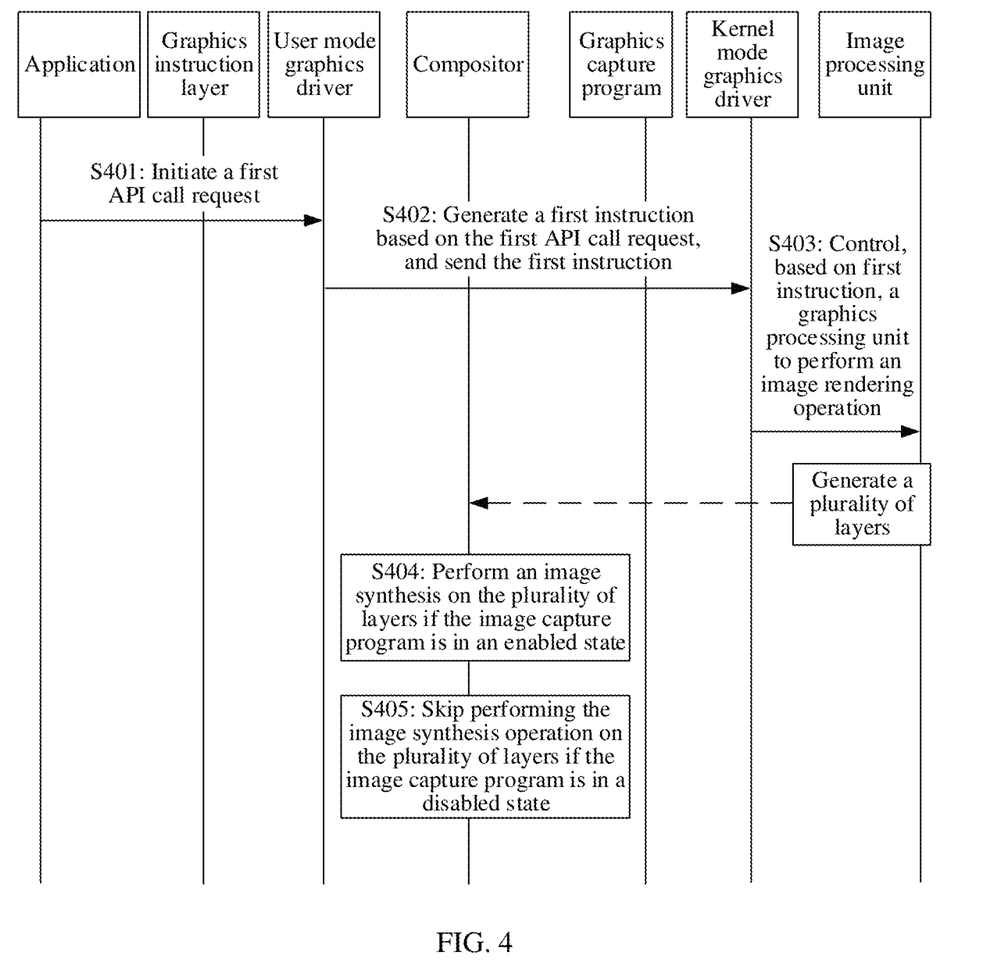
FIG. 4 is a schematic flowchart of an image processing method according to an embodiment.

The foregoing provides an overall description of an application scenario and an architecture of a computer system in the embodiments. The following describes, based on the application scenario and the architecture, how a computer system performs image processing. For details, refer to the embodiment shown in FIG. 4. FIG. 4 is a schematic flowchart of an image method according to an embodiment. The method includes, but is not limited to, the following steps.

Step S401: An application in a first guest operating system initiates a first API call request.

For example, the first guest operating system is any one of the plurality of guest operating systems. In other words, any one of the plurality of guest operating systems has a feature of the first guest operating system herein. The application is an application that has an image processing requirement, for example, a game application or a video production application. The application may generate a corresponding image rendering parameter for an image rendering objective that the application wants to achieve, and initiate the first API call request by using a graphics instruction layer. The first API call request is used to request to perform an image rendering operation. The first API call request may be understood through extension. For example, it is considered that the first API call request includes the image rendering parameter.

Step S402: A user mode graphics driver in the first guest operating system generates, based on the first API call request, a first instruction that can be identified by the graphics processing unit, and sends the first instruction to the kernel mode graphics driver.

For example, the user mode graphics driver may have a plurality of implementations, for example, an implementation of an Advanced Micro Devices (AMD), an implementation of Intel, and an implementation of Nvidia. The user mode graphics driver is responsible for translating and packaging data, a state, an instruction (or a command), or the like into an instruction that can be identified by hardware. In this embodiment, after obtaining the first API call request and the image rendering parameter, the user mode graphics driver generates, based on the first API and the image rendering parameter, an instruction that can be identified by the graphics processing unit, packages the instruction, and delivers the instruction to the kernel mode graphics driver.

Step S403: The kernel mode graphics driver controls, based on the first instruction, the graphics processing unit to perform the image rendering operation.

For example, the first instruction is an instruction that meets an operation specification of the graphics processing unit. Therefore, the kernel mode graphics driver may control the graphics processing unit according to the first instruction. Correspondingly, the graphics processing unit performs the image rendering operation under control of the kernel mode graphics driver, to achieve the image rendering objective of the foregoing application. It should be noted that the graphics processing unit obtains a plurality of layer layers after completing the image rendering operation, and the plurality of layer layers may be stored (for example, stored in a buffer) for subsequent call. It may be understood that a plurality of logical interfaces may be configured for the kernel mode graphics driver, and are respectively configured to connect to user mode graphics drivers in different guest operating systems.

Step S404: If the image capture program is in an enabled state, the compositor performs an image composition operation on the plurality of layer layers obtained by the graphics processing unit through rendering.

For example, the image capture program is registered with the image compositor in advance. Therefore, the image compositor may determine, based on registration information of the image capture program, whether the image capture program is in the enabled state. For example, the image capture program sets a flag bit through an interface provided by the image compositor. When a value of the flag bit is set to 1, it indicates that the image capture program is in the enabled state, and when the value of the flag bit is set to 0, it indicates that the image capture program is in a disabled state.

If the image capture program is in the enabled state, the image compositor performs the image composition operation on the plurality of layer layers obtained by the graphics processing unit through rendering. Two cases are used as examples for description.

Figure 5:
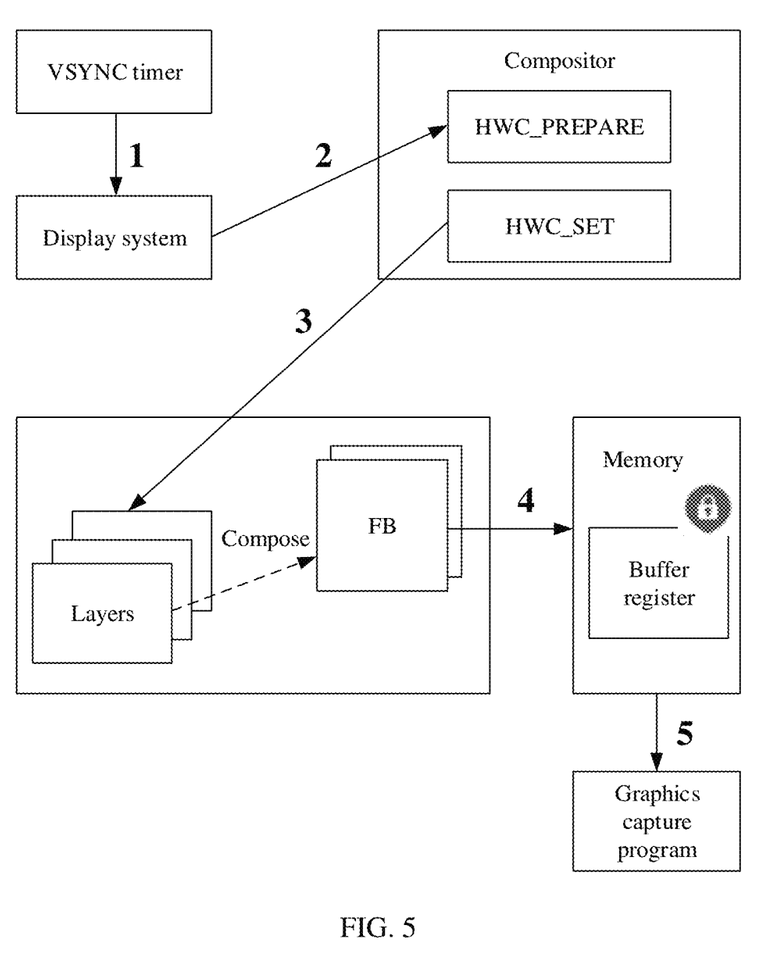
FIG. 5 is a schematic flowchart of image composition and image capture according to an embodiment.

Case 1: As shown in FIG. 5, image composition may include the following steps.

1. A display system (for example, SurfaceFlinger) triggers, at a specific time based on a frequency of frame synchronization (vertical synchronization, VSYNC) that the image capture program wants to obtain, the image compositor (composition) to perform composition on a main screen. For example, VSYNC is set to 30 frames/second. The image compositor needs to perform 30 composition operations per second. Optionally, a rate at which the image compositor performs image composition is the same as a rate at which the image capture program performs image capture.

2. The compositor performs preprocessing on the foregoing plurality of layer layers (for example, by using a function module hwc_prepare). In a preprocessing process, layer layers that need to be composited by the GPU are determined, and the determined layers are labelled with a "to-be-composited" marker. In the example, hwc in hwc_prepare is an abbreviation of hardware composer.

3. The compositor composites (for example, by using a function module hwc_set) the plurality of preprocessed layer layers into a buffer (framebuffer, FB) by using a GPU, for example, composites the plurality of preprocessed layers into a double FB. Further, the layer layers with the "to-be-composited" marker are composited into the FB. For example, the image compositor sends an image composition instruction through an OpenGL for embedded system (GLES) interface at the graphics instruction layer (graphic API), to request to perform the image composition operation. Correspondingly, the user mode graphics driver translates the image composition instruction into a second instruction that can be identified by the graphics processing unit, the kernel mode graphics driver controls, based on the second instruction, the graphics processing unit to perform the image composition operation on the plurality of layer layers, and the graphics processing unit buffers an image composition result to a double graphics buffer (FB).

4. The compositor obtains a lock of the buffer buffer, and, if successfully obtaining the lock, the compositor copies data of the image composition result in the lock of the double graphics buffer FB into a buffer buffer of a memory in a direct memory access (DMA) manner. This process is actually completed in cooperation with the GPU. In an embodiment, the process includes the following operations: the compositor sends a data migration instruction through a generic buffer manager (gbm) interface at the graphics instruction layer (graphic API), to request to migrate image composition data in a video memory of the GPU to the memory. Correspondingly, the user mode graphics driver translates the data migration instruction into a third instruction that can be identified by the GPU, and the kernel mode graphics driver controls, based on the third instruction, the graphics processing unit to migrate the image composition data in the video memory of the graphics processing unit to the memory.

Correspondingly, after completing image composition and migrating the image composition data to the memory in cooperation with the graphics processing unit, the compositor sends a notification event to the image capture program, to notify that image composition is completed and that the image composition data is migrated to the memory.

5. After receiving the notification event, the image capture program obtains the lock of the buffer, reads the image composition data in the buffer (in other words, captures composite image obtained by the image compositor through composition), encodes and compresses the image composition data (namely, the composite image), and then sends image data obtained through encoding and compression to a remote end, for example, to the user terminal 201 shown in FIG. 2. It may be understood that encoding and compression performed by the image capture program belongs to a software implementation. Further, the image capture program may alternatively not perform an encoding and compression operation, and instead, directly send captured image composition data to the remote end.

Figure 6:
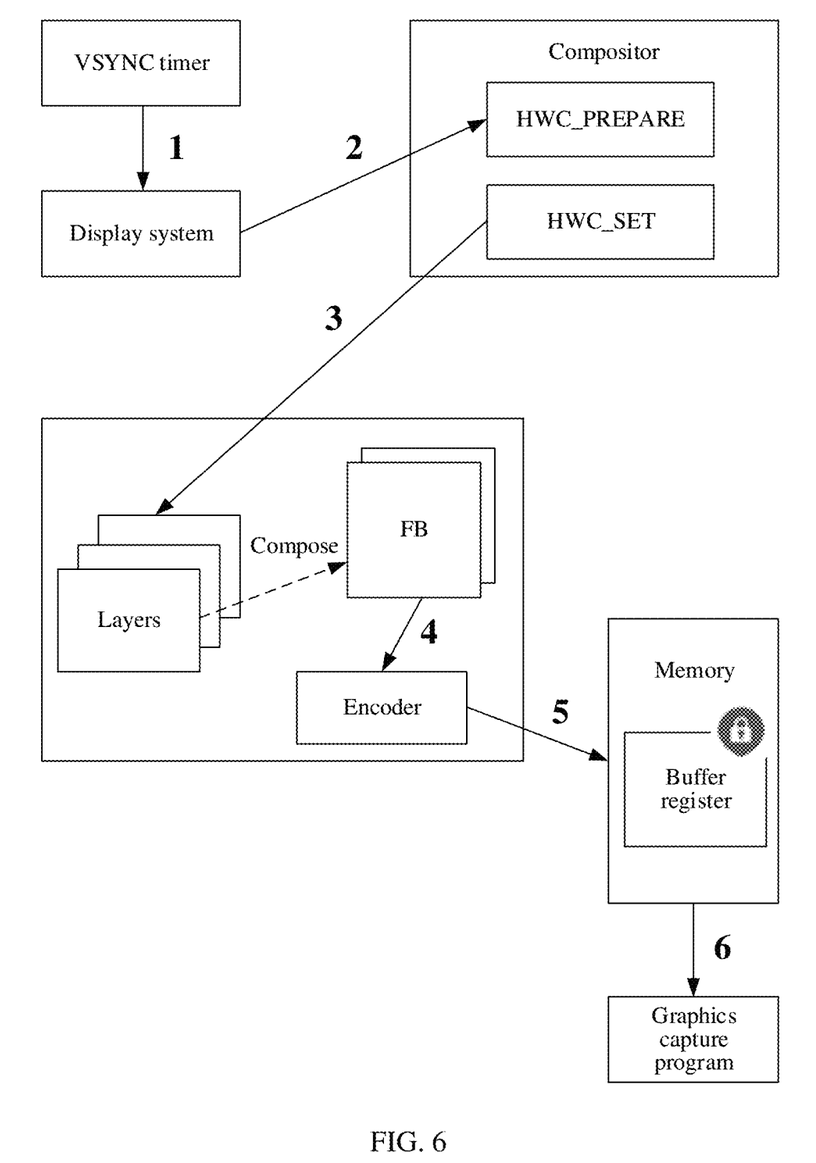
FIG. 6 is another schematic flowchart of image composition and image capture according to an embodiment.

Case 2: As shown in FIG. 6, image composition may include the following steps.

1. A display system (for example, SurfaceFlinger) triggers, at a specific time based on a frequency of frame synchronization (vertical synchronization, VSYNC) that the image capture program wants to obtain, the image compositor (composition) to perform composition on a main screen. For example, VSYNC is set to 30 frames/second. The image compositor needs to perform 30 composition operations per second. Optionally, a rate at which the image compositor performs image composition is the same as a rate at which the image capture program performs image capture.

2. The compositor performs preprocessing on the foregoing plurality of layer layers (for example, by using a function module hwc_prepare). In a preprocessing process, layer layers that need to be composited by the GPU are determined, and the determined layers are labelled with a "to-be-composited" marker.

3. The compositor composites (for example, by using a function module hwc_set) the plurality of preprocessed layer layers into a double graphics buffer (framebuffer, FB) by using a GPU. Additionally, layer layers with the "to-be-composited" marker are composited into the FB. For example, the image compositor sends an image composition instruction through a GLES interface at the graphics instruction layer (graphic API), to request to perform the image composition operation. Correspondingly, the user mode graphics driver translates the image composition instruction into a second instruction that can be identified by the graphics processing unit, the kernel mode graphics driver controls, based on the second instruction, the graphics processing unit to perform the image composition operation on the plurality of layer layers, and the graphics processing unit buffers an image composition result to a double graphics buffer FB.

4. The compositor obtains a lock of the buffer buffer. If successfully obtaining the lock, the compositor encodes and compresses data of the image composition result in the lock of the double graphics buffer FB through an encoder (for example, an H264 encoder or an H265 encoder).

5. The encoder stores image data obtained through encoding and compression in a buffer of a memory, releases the lock of the buffer after encoding and compression are finished, and sends a notification event, to notify that image data obtained through composition, encoding, and compression is migrated to the memory.

Figure 7:
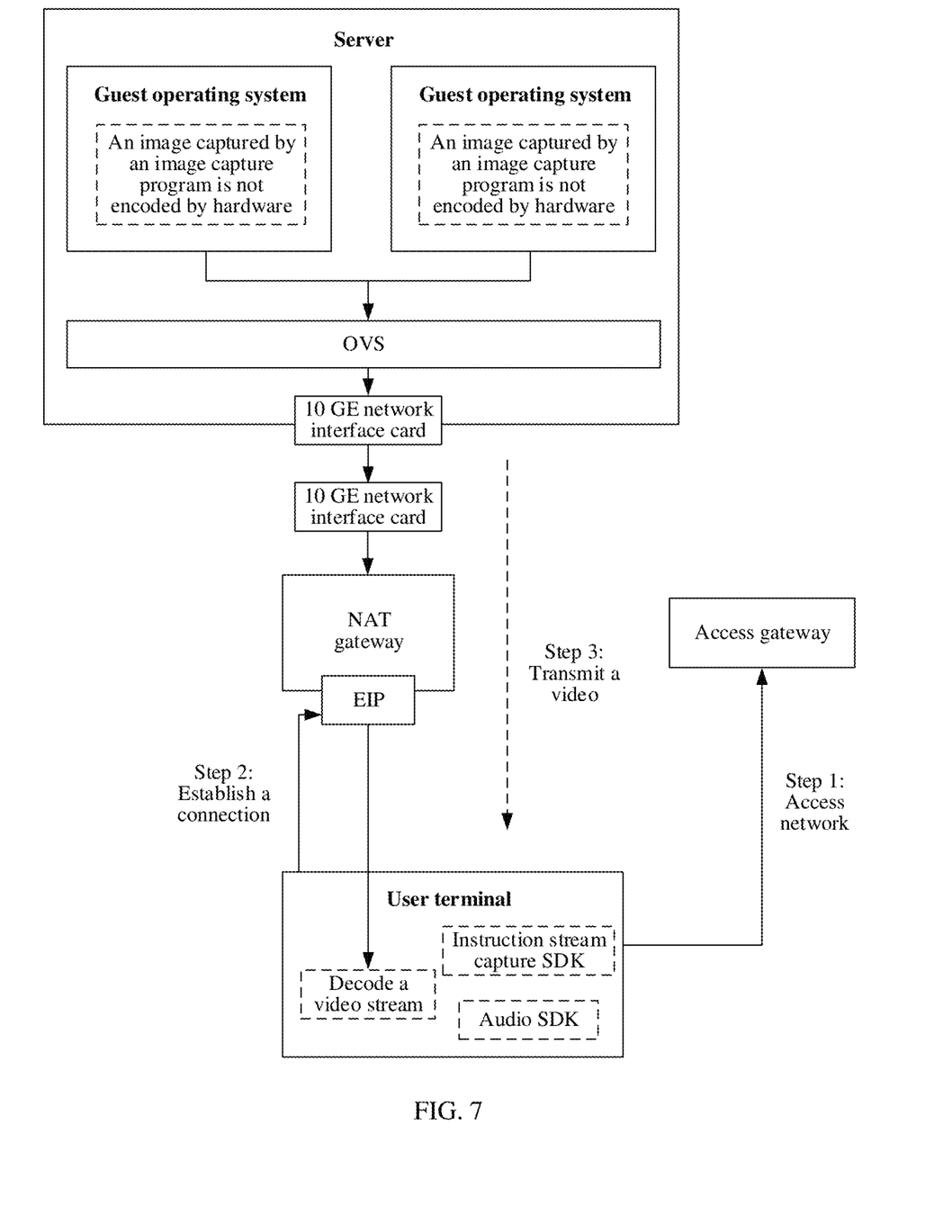
FIG. 7 is a schematic diagram of an application scenario of a captured image according to an embodiment.

6. After receiving the notification event, the image capture program obtains the lock of the buffer buffer, reads the data obtained through composition, encoding, and compression in the buffer (in other words, captures composite image obtained by the image compositor through composition), and sends captured image data to a remote end, for example, to the user terminal 201 shown in FIG. 2. To better understand the solution in this embodiment, the following provides a possible scenario, and describes a process of sending the captured image data to the remote user terminal 201. As shown in FIG. 7, an access gateway is configured to perform identity authentication and authorization for the user terminal, and identity authentication and authorization are performed for the user terminal in cooperation with the access gateway by using a software development kit (SDK). After identity authentication and authorization succeed, the user terminal establishes a connection to a cloud elastic IP address (EIP) by using the SDK. The user terminal is further configured to decode a video stream from a computer system by using the SDK. In addition, the user terminal is further configured to: decode an audio stream by using the SDK, and send an operation instruction (for example, touch control or mouse movement) to the guest operating system by using the SDK (Optionally, a guest operating system deployed in the computer system may be considered as a cloud mobile phone). In this embodiment, after an image capture program in the guest operating system in the computer system captures image data, and the image capture program sends the image data to an internal VPC network by using an open virtual switch (OVS) and the 10 GE (which belongs to a physical network interface card). A network address translation (NAT) gateway in a same VPC network delivers the image data to the user terminal by using the EIP, and the user terminal decodes the image data.

Figure 8:
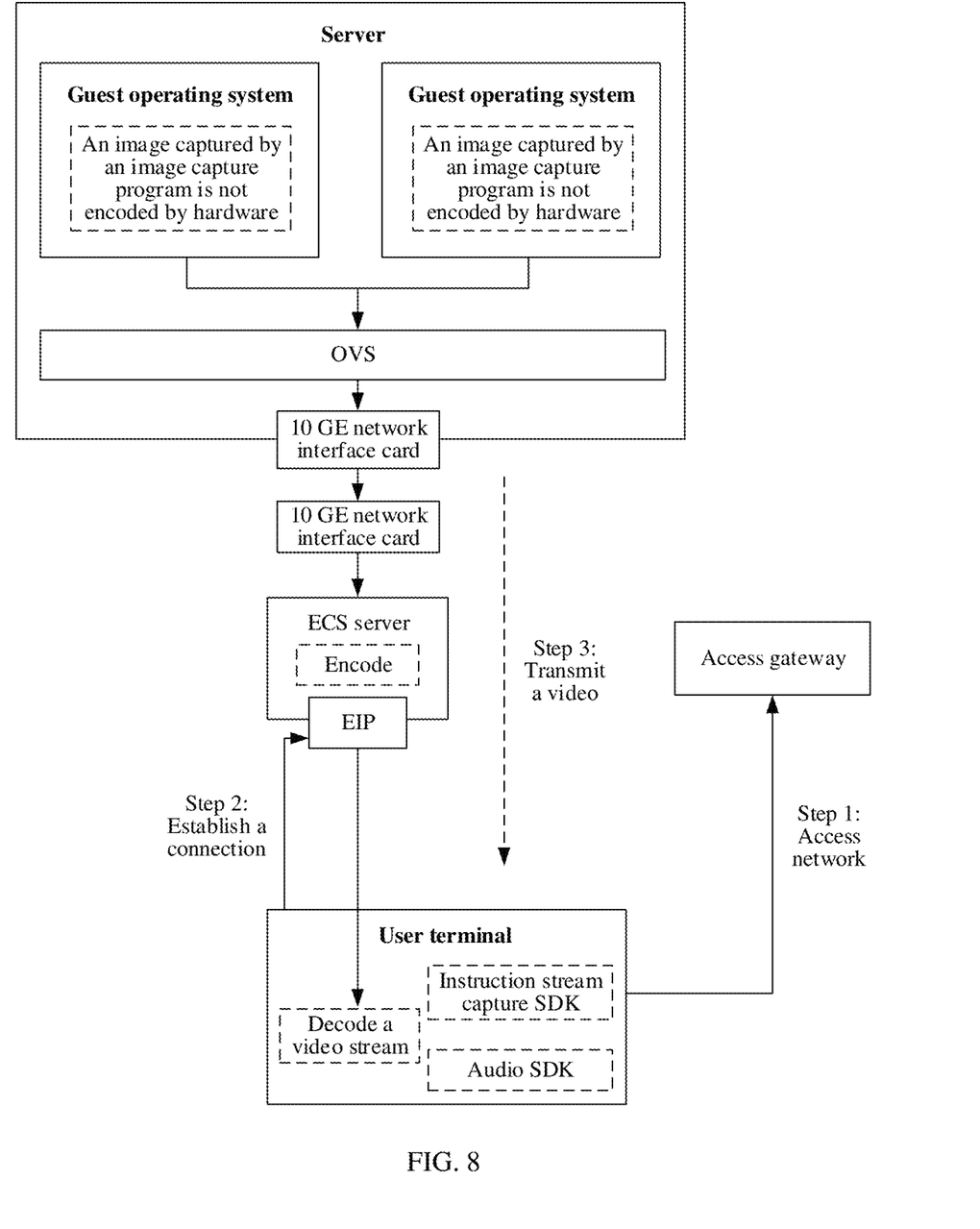
FIG. 8 is a schematic diagram of another application scenario of a captured image according to an embodiment.

For the foregoing step 5, the computer system may not include the encoder. In this case, the image data sent to the user terminal 201 in step 6 is image data that is not encoded. In this case, the following provides a possible scenario, to describe a process of sending the captured image data to the remote user terminal 201. As shown in FIG. 8, the access gateway is configured to perform identity authentication and authorization for the user terminal, and identity authentication and authorization are performed for the user terminal in cooperation with the access gateway by using the SDK. After identity authentication and authorization succeed, the user terminal establishes a connection to the, EIP by using the SDK. The user terminal is further configured to decode the video stream from the computer system by using the SDK. In addition, the user terminal is further configured to: decode an audio stream by using the SDK, and send an operation instruction (for example, touch control or mouse movement) to the guest operating system by using the SDK (Optionally, the guest operating system deployed in the computer system may be considered as a cloud mobile phone). In this embodiment, after the image capture program in the guest operating system in the computer system captures the image data, and the image capture program sends the image data to the internal VPC network by using the OVS and the 10 GE (which belongs to the physical network interface card). An encoding engine is deployed in an ECS computer system in a same VPC network, to encode the image data delivered by the computer system, and deliver the encoded image data to the user terminal by using the EIP, so that the user terminal decodes the encoded image data.

Step S405: If the image capture program is in the disabled state, the image compositor skips performing the image composition operation on the plurality of layer layers. For example, the VYSNC is set by using a default value, and the steps shown in FIG. 5 and FIG. 7 are not performed.

According to the foregoing policy of performing image composition based on a requirement, an image composition task is not performed when the image capture program is in the disabled state, to significantly reduce overheads of the graphics processing unit and the first processor. Therefore, the graphics processing unit and the first processor can apply more computing capabilities to another Android operating system with a requirement, to improve overall performance of a cloud computer system.

Table 1 shows a case of a comparison, in an actual test in a case in which a same application is run in a guest operating system (an Android system is used as an example), between a quantity of guest operating systems that may be supported by the cloud computer system provided in this embodiment and a quantity of guest operating systems that may be supported by the cloud computer system in a conventional solution.

TABLE 1

| Conventional solution | | Solution in this embodiment |
|---|---|---|
| "My name is MT 4" is run in an Android system | 30 | More than 60 |
| "Asktao" is run in the Android system | 90 | More than 120 |

It can be understood from Table 1 that when an application that is run in the Android system is "My name is MT 4", the cloud computer system in the conventional solution may support parallel running of 30 Android systems, but in this embodiment, parallel running of 60 Android systems is supported. When the application that is run in the Android system is "Asktao", the cloud computer system in the conventional solution may support parallel running of 90 Android systems, but in this embodiment, parallel running of 120 Android systems is supported.

In the method described in FIG. 4, the user mode graphics driver is deployed in the guest operating system, and the kernel mode graphics driver is deployed in the host operating system other than the guest operating system. A command generated by the user mode graphics driver may be directly submitted by the kernel mode graphics driver to the GPU for execution. Therefore, an instruction translation layer used to translate a command does not need to be additionally deployed between the guest operating system and the host operating system. Therefore, there is no need to perform an instruction translation operation by the instruction translation layer. Therefore, overheads of the first processor in the computer system are significantly reduced, an overall image processing (for example, rendering) process is simplified, and image processing efficiency is improved. In addition, even if a version of the guest operating system in the computer system is updated, the command generated by the user mode graphics driver in the guest operating system can still be directly identified by the kernel mode graphics driver in the host operating system. Therefore, in comparison with a conventional method, updating and maintenance of the instruction translation layer can be omitted, and overheads of the first processor are further reduced. It may be understood that the reduced overheads may support deployment of more guest operating systems in the computer system, to increase a concurrency amount of the computer system.

An embodiment further provides a computer-readable storage medium. The computer-readable storage medium stores an instruction, and when the instruction is run on a first processor, the procedure shown in any of the foregoing methods is implemented.

An embodiment further provides a computer program product. When the computer program product is run on a first processor, a procedure shown in any of the foregoing methods is implemented.

A person of ordinary skill in the art may understand that all or some processes of the methods in the embodiments may be implemented by a computer program instructing relevant hardware. The program may be stored in a computer-readable storage medium. When the program is run, the processes of the methods in the embodiments are performed. The foregoing storage medium includes various media that can store program code, for example, a ROM, a RAM, a magnetic disk, or an optical disc.

What is claimed is:

1. An image processing method, wherein the method is applied to a computer system comprising a host operating system, wherein a kernel mode graphics driver and a first guest operating system are installed in the host operating system, a user mode graphics driver is deployed in the first guest operating system, the first guest operating system further comprises an image compositor directly connected to an image capture program, and the method comprises:
   generating, by the user mode kernel driver based on a first application programming interface (API) call request, a first instruction that can be identified by a graphics processing unit;
   sending the first instruction to the kernel mode graphics driver, wherein the first API call request is used to request to perform an image rendering operation; and
   controlling, by the kernel mode graphics driver based on the first instruction, the graphics processing unit to perform image rendering.

2. The method according to claim 1, further comprising:
   determining, by the image compositor, a status of the image capture program; and
   skipping performing an image composition operation on a plurality of layers after the image capture program is in a disabled state.

3. The method according to claim 2, wherein, before determining, by the image compositor, the status of the image capture program, the method further comprises:
   registering, by the image capture program, state information with the compositor, wherein the state information is used to indicate that the image capture program is in an enabled state or in the disabled state.

4. The method according to claim 2, wherein if the image capture program is in the enabled state, a rate at which the image compositor performs image composition is the same as a rate at which the image capture program performs image capture.

5. The method according to claim 2, wherein if the image capture program is in the enabled state, the method further comprises:
   capturing, by the image capture program, a composite image obtained by the image compositor through composition;
   encoding and compressing, by the image capture program, the composite image; and
   sending, by the image capture program, image data obtained through encoding and compression to a remote end.

6. The method according to claim 2, wherein the computer system further comprises an image encoder, and if the image capture program is in the enabled state, the method further comprises:
   encoding and compressing, by the image encoder, a composite image obtained by the image compositor through composition;
   capturing, by the image capture program, image data obtained through encoding and compression; and
   sending, by the image capture program, the image data to a remote end.

7. The method according to claim 2, further comprising:
   reading, by the image compositor, a plurality of layers obtained by the graphics processing unit through rendering;
   sending, by the image compositor, an image composition instruction to the user mode graphics driver by using a generic buffer manager, wherein the image composition instruction is used to request to perform the image composition operation on the plurality of layers;
   generating, by the user mode graphics driver based on the image composition instruction, a second instruction that can be identified by the graphics processing unit;
   sending the second instruction to the kernel mode graphics driver; and
   controlling, by the kernel mode graphics driver based on the second instruction, the graphics processing unit to perform the image composition operation on the plurality of layers.

8. A computer system, comprising a host operating system deployed in the computer system, a kernel mode graphics driver and a first guest operating system deployed in the host operating system, the first guest operating system further comprises an image compositor directly connected to an image capture program, and a user mode graphics driver deployed in the first guest operating system;
   wherein the user mode kernel driver is configured to:
   receive a first application programming interface (API) call request, wherein the first API call request is used to request to perform an image rendering operation; and
   generate, based on the first API call request, a first instruction that can be identified by the graphics processing unit, and send the first instruction to the kernel mode graphics driver; and
   the kernel mode graphics driver is configured to control, according to the first instruction, the graphics processing unit to perform image rendering.

9. The computer system according to claim 8, wherein the image compositor is configured to:
   determine a status of the image capture program; and
   skip performing an image composition operation on the plurality of layers when the image capture program is in a disabled state.

10. The computer system according to claim 9, wherein the image capture program is configured to register state information with the compositor before the image compositor determines the status of the image capture program, wherein the state information is used to indicate that the image capture program is in an enabled state or in the disabled state.

11. The computer system according to claim 9, wherein if the image capture program is in the enabled state, a rate at which the image compositor performs image composition is the same as a rate at which the image capture program performs image capture.

12. The computer system according to claim 9, wherein the image capture program is configured to:
   when the image capture program is in the enabled state, capture a composite image obtained by the image compositor through composition,
   encode and compress the composite image, and send image data obtained through encoding and compression to a remote end.

13. The computer system according to claim 9, wherein the computer system further comprises an image encoder, wherein the image encoder is configured to:
when the image capture program is in the enabled state, encode and compress the composite image obtained by the image compositor through composition; and
the image capture program is configured to:
capture image data obtained through encoding and compression, and
send the image data to a remote end.

14. The computer system according to claim 9, wherein the image compositor being configured to:
when the image capture program is in the enabled state, perform the image composition operation on the plurality of layers obtained by the graphics processing unit through rendering comprises:
the image compositor is configured to:
when the image capture program is in the enabled state, read the plurality of layers obtained by the graphics processing unit through rendering;
the image compositor is configured to send an image composition instruction to the user mode graphics driver by using a generic buffer manager, wherein the image composition instruction is used to request to perform the image composition operation on the plurality of layers;
the user mode graphics driver is configured to:
generate, based on the image composition instruction, a second instruction that can be identified by the graphics processing unit, and
send the second instruction to the kernel mode graphics driver; and
the kernel mode graphics driver is configured to control, based on the second instruction, the graphics processing unit to perform the image composition operation on the plurality of layers.

15. A computer system, wherein the computer system comprises a first processor, a memory, and a graphics processing unit, wherein
the memory is configured to store computer-readable instructions;
the first processor is configured to run the computer-readable instructions, to implement an image processing method applied to the computer system, the computer system further comprises a host operating system, a kernel mode graphics driver and a first guest operating system installed in the host operating system, a user mode graphics driver deployed in the first guest operating system, the first guest operating system further comprises an image compositor directly connected to an image capture program, and the method comprises:
generating, by the user mode kernel driver based on a first application programming interface (API) call request, a first instruction that can be identified by a graphics processing unit;
sending the first instruction to the kernel mode graphics driver, wherein the first API call request is used to request to perform an image rendering operation; and
controlling, by the kernel mode graphics driver based on the first instruction, the graphics processing unit to perform image rendering, wherein the graphics processing unit is configured to perform image rendering under control of the first processor.

* * * * *